United States Patent
Uchida

(10) Patent No.: US 8,488,606 B2
(45) Date of Patent: Jul. 16, 2013

(54) SYSTEM CONTROLLER, SEMICONDUCTOR DEVICE, AND METHOD OF TESTING INTERFACE

(75) Inventor: Kenji Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 384 days.

(21) Appl. No.: 12/367,060

(22) Filed: Feb. 6, 2009

(65) Prior Publication Data
US 2009/0285214 A1    Nov. 19, 2009

(30) Foreign Application Priority Data

May 16, 2008    (JP) .................................. 2008-129615

(51) Int. Cl.
*H04L 12/56* (2006.01)

(52) U.S. Cl.
USPC ...... 370/392; 370/394; 370/395.62; 370/503; 370/519; 375/219; 375/354; 710/100

(58) Field of Classification Search
None
See application file for complete search history.

(56) References Cited

U.S. PATENT DOCUMENTS

| 5,341,096 A | 8/1994 | Yamamura |
| 6,725,449 B1 | 4/2004 | Maeda et al. |
| 2008/0043750 A1* | 2/2008 | Keels et al. ............... 370/395.52 |
| 2009/0113245 A1* | 4/2009 | Conner ........................... 714/33 |

FOREIGN PATENT DOCUMENTS

| JP | 60-171848 | 9/1985 |
| JP | 3-42850 A | 2/1991 |
| JP | 2001-134469 A | 5/2001 |
| JP | 2007-102358 A | 4/2007 |

OTHER PUBLICATIONS

Japanese Office Action mailed Feb. 26, 2013 for corresponding Japanese Application No. 2008-129615, with Partial English-language Translation.

* cited by examiner

*Primary Examiner* — Ayaz Sheikh
*Assistant Examiner* — Nicholas Sloms
(74) *Attorney, Agent, or Firm* — Fujitsu Patent Center

(57) ABSTRACT

A semiconductor device capable of connecting plurality of external devices. When an interface with a first external device that can be connected to the semiconductor device is tested, a packet to be transferred from the first external device to another second external device is artificially generated. The generated packet is transferred to the second external device, and a response is monitored. Thus, the interface for connection to the first external device is tested while avoiding an actual packet transfer between the semiconductor device and the first external device.

10 Claims, 7 Drawing Sheets

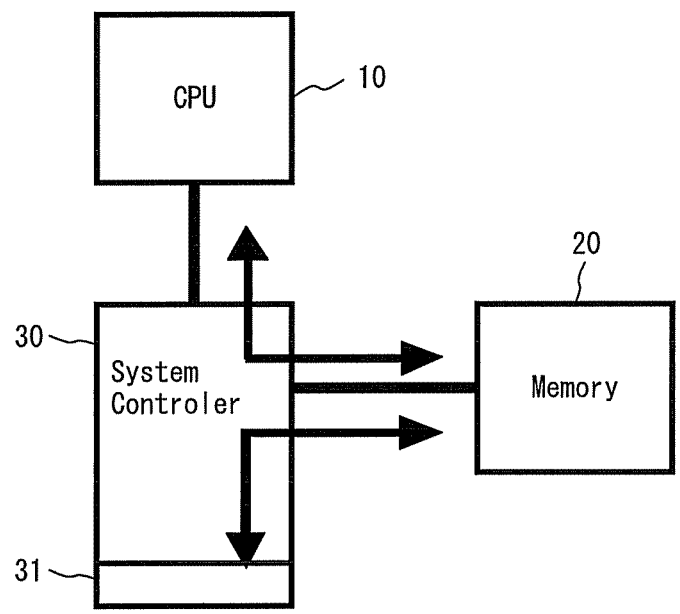
F I G. 3

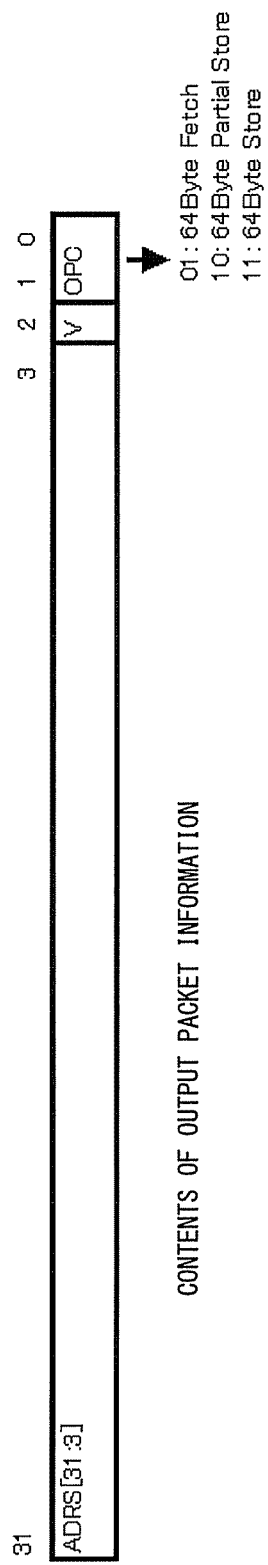
F I G. 5

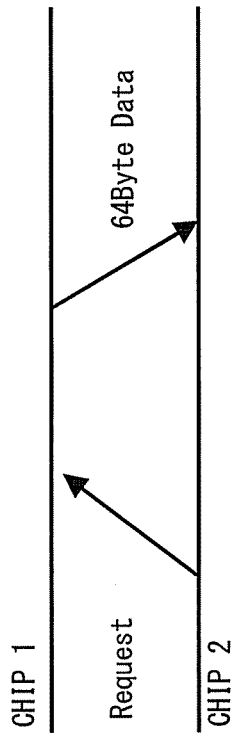
F I G. 6A
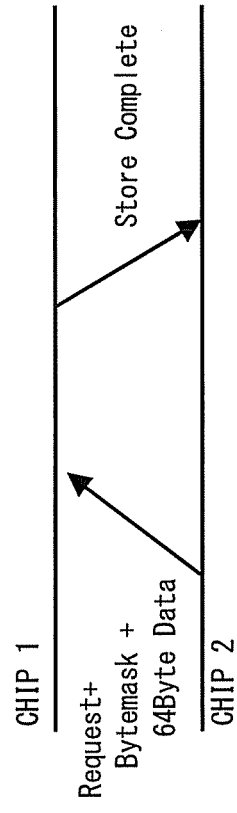
F I G. 6B
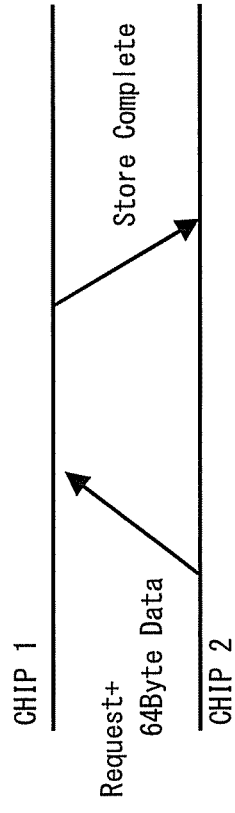
F I G. 6C

SYSTEM CONTROLLER, SEMICONDUCTOR DEVICE, AND METHOD OF TESTING INTERFACE

CROSS-REFERENCE TO RELATED APPLICATION

This application is based upon and claims the benefit of priority of the prior Japanese Patent Application No. 2008-129615, filed on May, 16, 2008, the entire contents of which are incorporated herein by reference.

FIELD

The embodiment of the present invention relates to the technology of testing an interface for connection to an external device in a semiconductor device capable of connecting to a plurality of external devices such as a system controller.

BACKGROUND

In a computer (data processing device), a system controller is used in connecting semiconductor devices such as a CPU, memory, etc. FIG. 1 illustrates the configuration of the data processing device designed by connecting a plurality of semiconductor devices to the system controller. In the data processing device, as illustrated in FIG. 1, each of a CPU 50, memory 60, and an I/O controller 70 is connected to a system controller 80. The I/O controller 70 controls a storage device such as a hard disk device, an optical disk device, etc., or communicates with an external device. Each semiconductor device of the memory 60 and the I/O controller 70 corresponds to an external device to the system controller 80.

Between connected semiconductor devices, internal clocks are not synchronous with each other in many cases. Therefore, it is common that a semiconductor device is loaded with a synchronization circuit as illustrated in FIG. 2. In FIG. 2, two connected semiconductor devices are expressed as "CHIP". A buffer 91 stores a packet (data) to be transferred to a semiconductor device 100. A pointer 92 points to the buffer 91 storing a packet provided from inside a semiconductor device 90. A decoder 93 decodes a point value outputted by the pointer 92, and stores a packet in the buffer 91 corresponding to the point value. A selector 94 selects one of the packets stored in the buffer 91. A pointer 95 specifies a packet to be selected by the selector 94. A buffer 96 stores a packet outputted by the selector 94. A component operating with an internal clock is indicated by dots. A component without dots operates with a clock of a transmission line etc. (hereinafter referred to as an "interface clock"). It is clear from FIG. 2, the part of the interface for the outside operates with low speed.

When an interface between semiconductor devices is verified (tested), it is necessary that a target semiconductor device, that is, a semiconductor device whose interface is used in transferring a packet, is connected. Some semiconductor devices require another device (for example, a storage device) to be connected. However, immediately after a semiconductor device has newly appeared on the market, there can be normally a case where a target semiconductor device cannot be appropriately connected, or a case where a device located prior to a target semiconductor device cannot be appropriately connected. In these cases, the verification of the interface between the semiconductor devices is delayed, thereby imposing undesired effects on the processes. For example, in the data processing device illustrated in FIG. 1, accessing from the CPU 50 to the memory 60 and accessing from the I/O controller 70 to the memory 60 are the main data flows. However, when the I/O controller 70 cannot be connected, the interface between the system controller 80 and the I/O controller 70 cannot be verified. Thus, it is important to be able to verify an interface to some extent.

The interface can also be verified by connecting after externally arranging a plurality of other devices other than a semiconductor device (Japanese Published Patent Application No. S60-171848). However, in the conventional method, the entire device becomes upsized to perform verification, and very costly. Therefore, it is important to perform the verification at a lower cost.

SUMMARY

In a semiconductor device according to an aspect of the present invention, when an interface with a first external device to be connected is tested, a packet to be transferred from the first external device to another second external device is artificially generated using packet information prepared for the test, and a response after the transfer of the generated packet to the second external device is monitored, thereby testing the interface for connection to the first external device by avoiding an actual transfer of the packet between the semiconductor device and the first external device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 3 is an explanatory view of the configuration of the data processing device of an embodiment of the present invention;

FIG. 5 illustrates the configuration of the data of the packet information used in generating a pseudo packet;

FIGS. 6A through 6C are explanatory views of an example of the transaction flow realized by generating a pseudo packet according to the packet information.

DESCRIPTION OF EMBODIMENTS

Embodiments of the present invention are described below with reference to the attached drawings.

FIG. 3 is an explanatory view illustrating the configuration of the data processing device (computer) to which the testing method according to an embodiment is applied. The data processing device according to the present embodiment is designed by connecting each of a CPU 10 and memory 20 to a system controller 30 as illustrated in FIG. 3.

Figure 1:
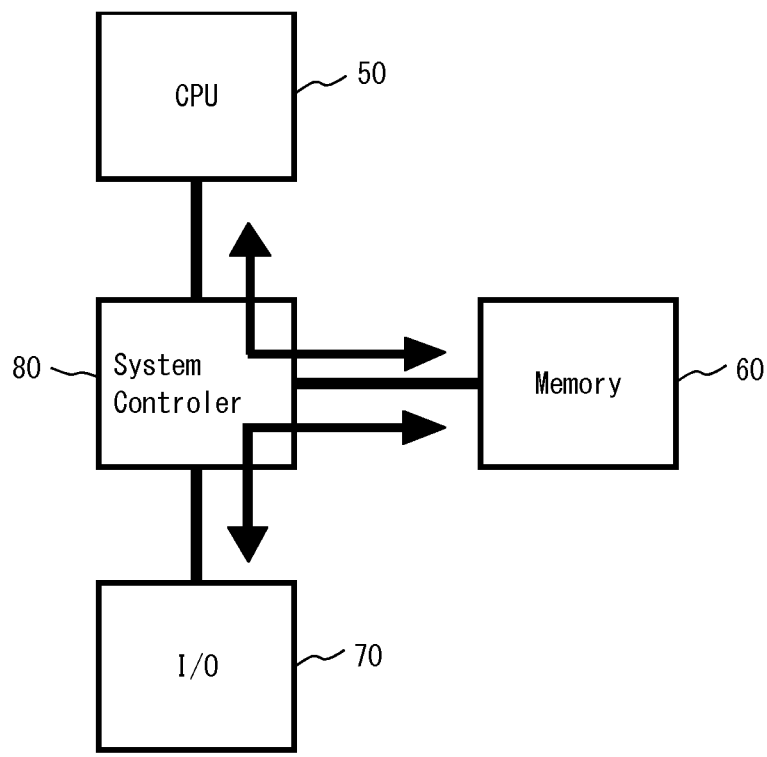
FIG. 1 illustrates the configuration of the data processing device designed by connecting a plurality of semiconductor devices to a system controller.
Figure 2:
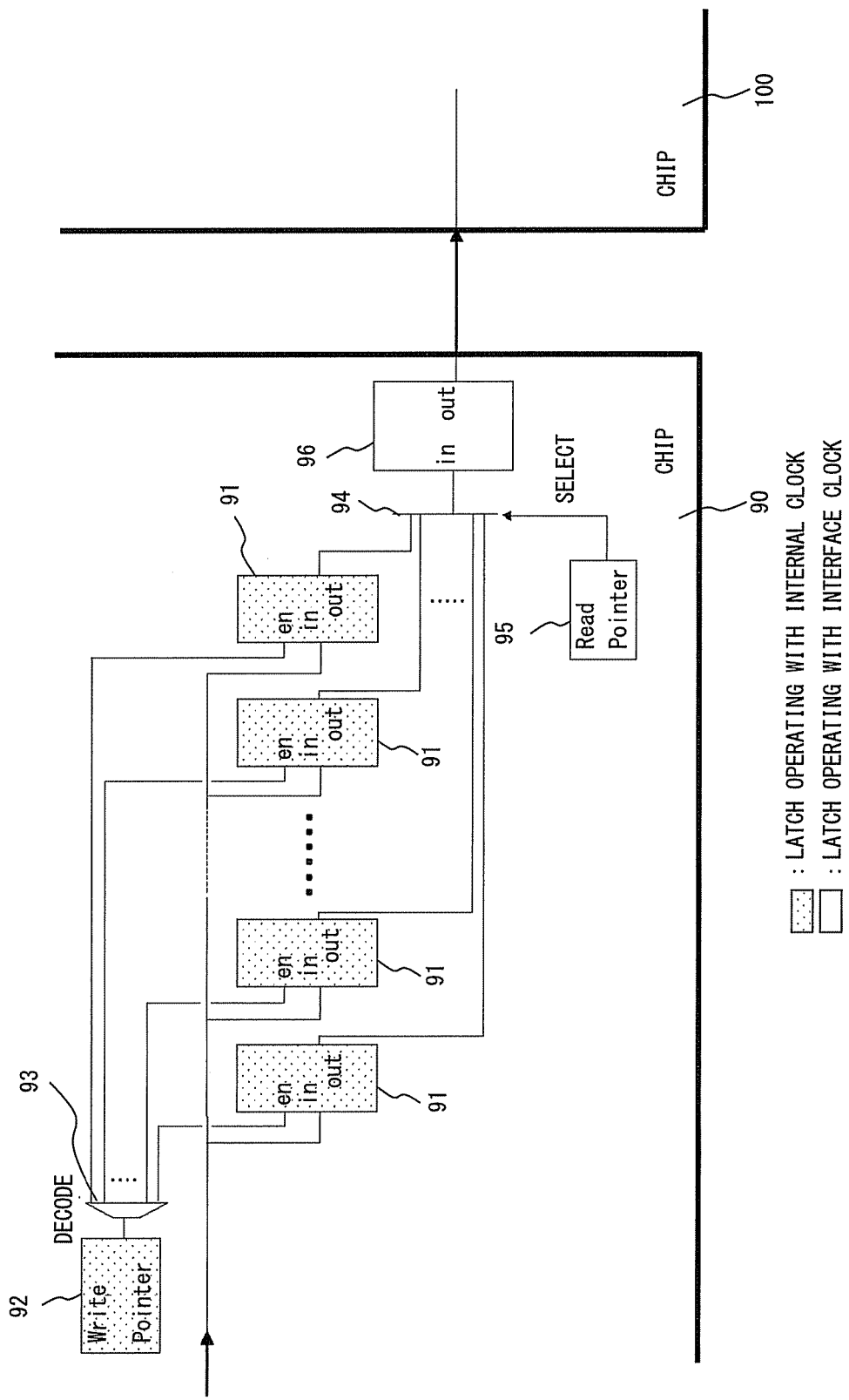
FIG. 2 illustrates a synchronization circuit loaded into a conventional semiconductor device.

A synchronization circuit 31 illustrated in FIG. 3 is implemented in the system controller 30. The synchronization circuit 31 according to the present embodiment artificially realizes the state in which the system controller 30 is connected to an external device different from the CPU 10 and the memory 20 illustrated in FIG. 3, for example, the I/O controller 70 illustrated in FIG. 1. In the present embodiment, the synchronization circuit 31 artificially realizes the data transmission between semiconductor device, for example, between the I/O controller 70 and the memory 20, connectable to the synchronization circuit 31.

The synchronization circuit 31 artificially generates a packet to be presumably transferred from a virtual external semiconductor device not practically connected. Thus, a packet transfer between the virtual external semiconductor device and another external semiconductor device connected to the system controller 30 can be artificially realized. With the configuration, a test for verifying an interface for a virtual external semiconductor device not actually connected to the system controller 30 can be performed. The external semiconductor device virtually connected to the system controller 30 by the interface to be verified is hereinafter referred to as a "target CHIP".

Figure 4:
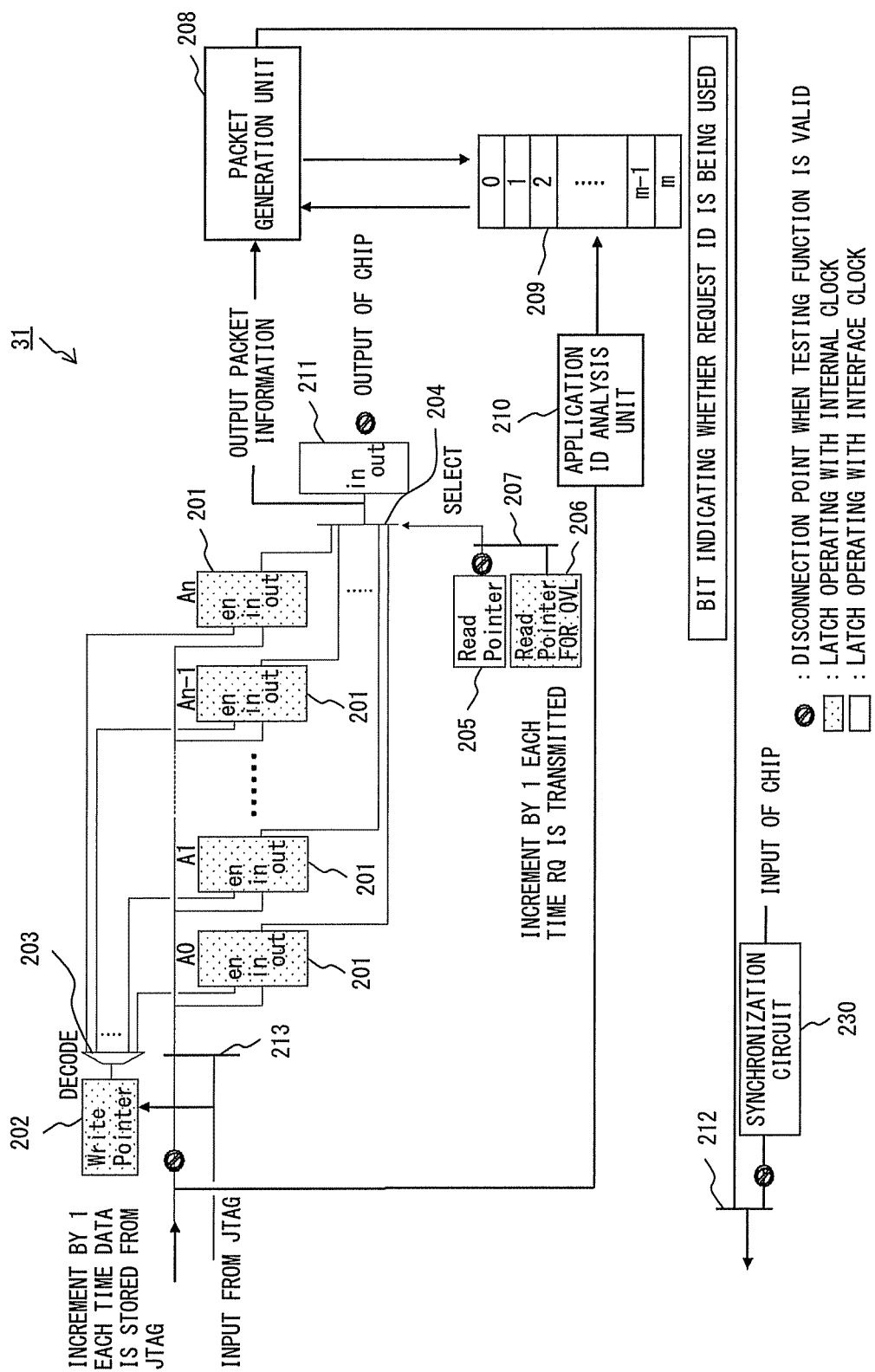
FIG. 4 illustrates the synchronization circuit according to an embodiment of the present invention.

FIG. 4 illustrates the configuration of the synchronization circuit 31. In FIG. 4, a buffer 201 stores a packet (data) issued for a target CHIP. In the example illustrated in FIG. 4, a total of n+1 synchronization buffers are provided. A pointer 202 specifies the buffer 201 storing a packet. A decoder 203 decodes a point value outputted by the pointer 202, and stores a packet in the buffer 201 corresponding to the point value. A selector 204 selects one of the packets stored in each buffer 201. A pointer 205 specifies a packet to be selected by the selector 204. A pointer 206 is used for the pointer 205 in a test mode. In the test mode, since the point value of the pointer 206 is provided to the selector 204, "for OVL" is expressed in FIG. 4. "OVL" indicates an overlay. A selector 207 selects one of the point values outputted by the two pointers 205 and 206. A packet generation unit 208 inputs packet information outputted from the selector 204 in the test mode, and artificially generates a packet to be transferred from the target CHIP according to the packet information. A reference numeral 209 denotes a register. An application ID analysis unit 210 analyzes a response after a transfer of a packet artificially generated in the test mode. A reference numeral 211 denotes a buffer, and reference numerals 212 and 213 denote selectors. A synchronization circuit 230 fetches a packet (expressed as "CHIP input" in FIG. 4) outputted from the semiconductor device (target CHIP) connected to the system controller 30 in the normal mode. In FIG. 4, a component operating with an internal clock is expressed by dots. A component without dots operates with a clock (interface clock) provided externally through a transmission line etc.

FIG. 5 illustrates the data configuration of the packet information stored in each buffer 201. The packet information illustrated in FIG. 5 is prepared for a test in accordance with the JTAG, and inputted externally from the system controller 30. Thus, the test mode corresponds to the state in which the system controller 30 is controlled by an externally input test signal, and the normal mode corresponds to the state not controlled so. In the test mode, unlike in the normal mode, each buffer 201 stores packet information replacing a normal packet. The packet information according to the present embodiment stores address information ADRS, valid V indicating whether or not the packet information is valid, and a request code OPC indicating the type of request.

The packet information illustrated in FIG. 5 is based on the assumption that access is gained from the semiconductor device virtually connected to the system controller 30 to the memory 20 with the configuration illustrated in FIG. 3. In this process, a packet artificially generated according to the packet information illustrated in FIG. 5 is based on the assumption of the packet transferred from the I/O controller 70 to the memory 60 according to an example of the configuration illustrated in FIG. 1. According to the present embodiment, the destination of the transfer of the packet from the target CHIP, that is, the semiconductor device which returns a response using an artificially generated packet is only the memory 20 assumed. In the assumption, the request code OPC is the data indicating the contents of the access requested to the memory 20.

FIGS. 6A through 6C are explanatory views of an example of the transaction flow realized by generating a pseudo packet according to the packet information illustrated in FIG. 5. In FIGS. 6A through 6C, CHIP 1 corresponds to the memory 20, and CHIP 2 corresponds to a target CHIP, that is, a virtual semiconductor device capable of transferring a packet through the synchronization circuit 31, for example, the I/O controller 70 illustrated in FIG. 1.

FIG. 6A illustrates the transaction flow of CHIP 2 transmitting a packet (Request) for requesting a transmission of 64-byte data to CHIP 1, and 64-byte data (64 Byte Data) being transmitted from CHIP 1 to CHIP 2 in the packet (64 Byte Fetch) FIG. 6B illustrates the transaction flow of CHIP 2 transmitting data less than 64 bytes (Byte Mask+64 Byte Data) together with a packet (Request) for requesting storage of the data, and CHIP 1 notifying CHIP 2 of the completion of the storage (Store Complete) through the packet (64 Byte Partial Store). FIG. 6C illustrates the transaction flow of CHIP 2 transmitting 64-byte data together with a packet (Request) for requesting storage of the data, and CHIP 1 notifying CHIP 2 of the completion of the storage (Store Complete) through the packet (64 Byte Store). The transaction flow illustrated in FIGS. 6A through 6C can be realized by storing different request codes OPC in a packet.

In the present embodiment, when a test is conducted to verify a interface for a target CHIP of the system controller 30, a pseudo packet for realizing the transaction flow as illustrated in FIGS. 6A through 6C is generated as follows. The generation of the packet is practically described below with reference to FIG. 4. In the description below, the internal configuration of the system controller 30 in which a packet is outputted to the synchronization circuit 31, or a packet fetched by the system controller 30 from an external semiconductor device (target CHIP) is outputted is conveniently referred to as a "internal circuit". The internal circuit inputs and processes a packet fetched by the synchronization circuit 230.

In the test mode, the signal line for transferring a packet from the internal circuit to each buffer 201 is disconnected. That is, a select signal for prohibiting the selector 213 from selecting the signal line is provided for the selector 213 externally from the system controller 30. Similarly, the line between the pointer 205 and the selector 204, the signal line of the output terminal of the buffer 211, and the line between the synchronization circuit 230 and the internal circuit are also disconnected. The line between the pointer 205 and the selector 204 is disconnected by providing the selector 207 with a select signal for selection of the pointer 206 externally from the system controller 30. The line between the synchronization circuit 230 and the internal circuit is disconnected by providing the selector 212 with a select signal for selection of the packet generation unit 208 externally from the system controller 30. The signal line at the output terminal of the buffer 211 is connected to the terminal provided for the system controller 30 through, for example, an AND gate. The signal line is connected to the input terminal of the AND gate, and an external signal can be provided for the other input terminal of the AND gate. Therefore, the signal line can be switch between connection and disconnection by a signal externally provided.

As a result of disconnecting the signal line from the internal circuit through the selector 213, each buffer 201 can store only the packet information from the JTAG, and the buffer 201 specified by the point value outputted by the pointer 202 stores the packet information from the JTAG. Thus, a piece of the packet information stored in each buffer 201 is selected by the selector 207, and outputted to the packet generation unit 208. The selector 207 selects one of the buffers 201 depending on the point value inputted from the pointer 206 (or the pointer 205).

Each buffer 201 is provided with an input (in) terminal, an output (out) terminal, and an enable (en) terminal. The input terminal, the output terminal, and the enable terminal of each buffer 201 are respectively connected to the selector 213, the selector 204, and the decoder 203. The decoder 203 outputs a signal for activation only to one of the buffers 201 depending on the point value outputted by the pointer 202. The buffer 201 that has received the activation signal at the enable terminal holds the packet information outputted from the selector 213. Each buffer 201 outputs the stored packet information from its output terminal.

When a testing signal is not externally provided, that is, in the normal mode, the selector 213 selects a signal line from the internal circuit. Similarly, the selectors 207 and 212 respectively select the pointer 205 and the synchronization circuit 230. The signal line at the output terminal of the buffer 211 is disconnected. As a result, each buffer 201 holds a packet outputted from the internal circuit, and a packet held in any of the buffers 201 can be outputted to a target CHIP through the selector 204 and the buffer 211 depending on the point value of the pointer 205. The packet outputted from a target CHIP and fetched into the synchronization circuit 230 is outputted to the internal circuit through the selector 212.

The register 209 is a storage device for managing the request ID as the information for identification of a pseudo packet generated by the packet generation unit 208, and can store m+1 bit data. The value of each bit is state information about whether or not the value indicating the position of the bit. The value of a bit is "1" referring to "being used", and "0" referring to "unused".

The packet generation unit 208 determines the information to be stored in a packet according to the input packet information, and stores the information. To determine a request ID, the packet generation unit 208 retrieves and specifies in, for example, an ascending order storage areas storing a bit "0" in the register 209. The value indicating the position of the specified storage area is stored as request ID in a generated packet. The packet generation unit 208 thus generates and outputs the packet. In addition, the packet generation unit 208 changes from 0 to 1 the value of the bit recorded in the storage area corresponding to the request ID stored in the packet. A packet is generated only when the valid V in the packet information indicates "valid".

The packet outputted from the packet generation unit 208 is transferred to the memory 20 through the selector 212 and the internal circuit. If the packet generated by the packet generation unit 208 is normally transferred to the memory 20, the memory 20 returns a response to the target CHIP. The packet generation unit 208 operates with an interface clock. Therefore, the packet generated and outputted by the packet generation unit 208 is transferred to the target CHIP from the memory 20, and the transfer allows the packet to be recognized as a packet transmitted as a reply from the target CHIP.

Thus, an interface for a target CHIP can be artificially verified without practically connecting the target CHIP to the system controller 30.

The response stores, for example, a request ID. Therefore, the request ID is used in confirming about whether or not a request by a packet has been processed. For the necessity of the confirmation, it is the information uniquely specifying a packet (request). In FIG. 4, a packet is expressed by "RQ" because it is generated for any request.

The pointer 206 increments a point value by generating and transferring a packet. The increment of the point value is performed according to, for example, an externally provided signal. That is, a packet (request) is generated and transferred, and a point value is incremented under the control of an externally provided signal. Since the buffer 201 to be selected by the selector 204 depends on the point value of the pointer 206, different packet information is outputted from the buffer 201 to the packet generation unit 208 through the selector 204 by the increment of the point value by the pointer 206. The pointer 202 increments the point value each time the data from the input JTAG, that is, the packet information, is stored in the buffer 201. Thus, a buffer 201 for storing newly inputted packet information is switched for packet information to be inputted next.

The response from the memory 20 is inputted to the application ID analysis unit 210 through the internal circuit. The application ID analysis unit 210 analyzes the input response, and determines on the basis of the response whether or not the packet transferred to the memory 20 has been correctly processed. If it is determined that the packet transferred to the memory 20 has been correctly processed, the application ID analysis unit 210 specifies the request ID stored in the packet processed in the memory 20. Then, the application ID analysis unit 210 changes the value of the bit of the register 209 corresponding to the specified request ID from 1 to 0. Thus, the request ID as "being used" is changed into "unused" upon receipt of the response. As a result, the request ID changed into "unused" can be used hereinafter.

On the other hand, the request ID of a packet whose response is not received by the application ID analysis unit 210, or whose response does not refer to a correctly processed packet remains "being used", and does not recover to an available state. As a result, when any fault exists in an interface, there is a decreasing number of available request IDs when the packet generation unit 208 generates and transfers packets. Therefore, by confirming the contents of the register 209, the presence/absence of a fault during the transfer of a packet, and the level of the fault can be grasped.

Figure 7:
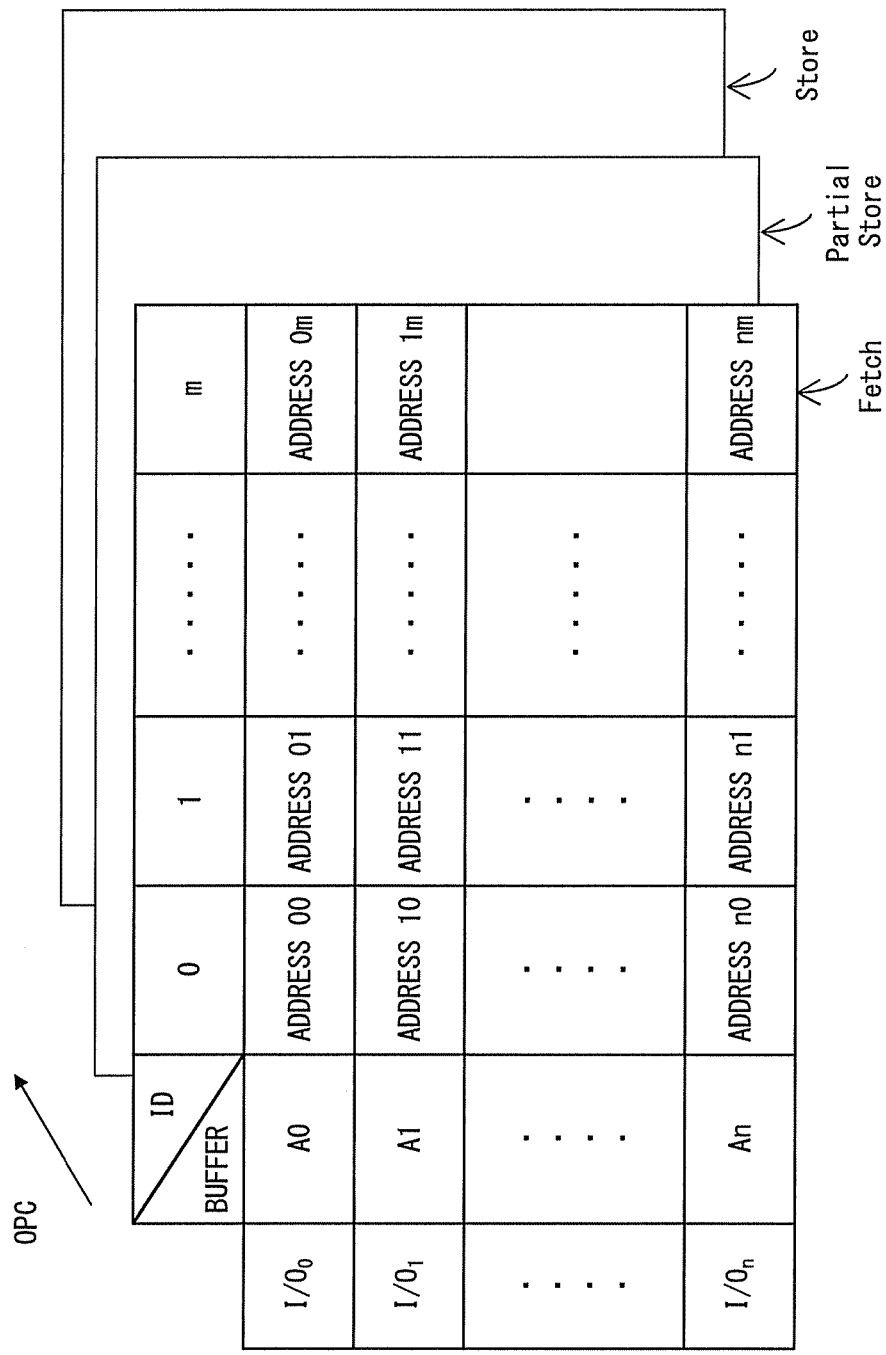
FIG. 7 is an explanatory view of the contents that can be verified by generating a pseudo packet.

FIG. 7 is an explanatory view of the contents that can be verified by generating a packet by the packet generation unit 208. By an artificially generated packet, a target CHIP is emulated by the address of the memory 20 specified by the packet, and the interface is verified through the artificially represented address. Thus, the necessity to actually connect the target CHIP such as the I/O controller 70 etc. can be avoided. FIG. 7 is a conceptual table illustrating examples of possible combinations of the request IDs, the buffers 201 storing the packet information used in generating a packet, and the addresses specified by the address information ADRS. Each buffer 201 is expressed by "A0" through "An". "00", "10", etc. expressed after each address are added to indicate that the address values are different from one another.

Each buffer 201 storing the packet information used in generating a packet can be assigned a different address space in the memory 20 accessed by a target CHIP such as the I/O controller 70 etc. In FIG. 7, the address space can be expressed by "I/O$_0$" through "I/O$_n$". Since the register 209 is m+1 bits, m+1 packets having different request IDs and address information ADRS can be continuously generated from a piece of packet information. Packets can be continuously generated by loading the packet generation unit 208 with the function of sequentially updating the address information ADRS. In this case, the pointer 206 can increment the point value after generating all packets to be generated. Thus, the relationship between a packet to be generated and packet information is not necessarily one to one.

The verification for each buffer 201 (address space) can be performed by each request code OPC. Concretely, in the examples illustrated in FIGS. 6A through 6C, the verification can be performed for each type of requests, that is, 64 Byte Fetch, 64 Byte partial Store, and 64 Byte Store, and they can be switched by the request code OPC. Therefore, in FIG. 7, a table is separately prepared for each type of requests "Fetch", "Partial Store", and "Store" that can be specified by the request code OPC.

The number of addresses assignable to each buffer 201 is not limited to m+1, but it can be more or less than m+1. In the above-mentioned embodiment, there are three types of request codes OPC, but the number of types of OPC is not limited to three.

The semiconductor device according to the present embodiment is the system controller 30 to which the present invention is applied, but the semiconductor device to which the present invention can be applied is not limited to the system controller 30. That is, the present invention can be widely applied to semiconductor devices for realizing a packet transfer between two or more external semiconductor devices connected to each other. Although the embodiment of the present inventions have been described in detail, it should be understood that the various changes, substitutions, and alterations could be made hereto without departing from the spirit and scope of the invention.

As described above, by artificially generating in a semiconductor device a packet that can be presumably received from the first external device and transferred to the second external device, and transferring to the second external device, the necessity to actually connect the first external device can be avoided. Also avoided can be the necessity to connect a substitute device for the first external device. The packet can be a data transmission unit between external devices connected to each other, and is not specifically limited.

The second external device to which the generated packet is transferred returns a response after processing the packet. By monitoring the response, the presence/absence of a failure occurring during the process of transferring the packet can be checked.

The packet is generated by assuming a transfer from the first external device. Based on the assumption, the packet is transferred through a path including the interface for connection to the first external device. Therefore, the interface for connecting to the first external device can also be verified (tested).

Therefore, when embodiment of the present invention is applied, an interface with an external device, that is, an interface for connection of a semiconductor device to the external device can be verified (tested) without actually connecting an external device to be connected or a substitute device for the external device. Since it is not necessary to connect an external device to be connected, or a substitute device for the external device, the verification (test) can be performed at a low cost and for a shorter time. As a result, advantages can be obtained in both costwise (cost-cutting) and conformance to the processes.

The invention claimed is:

1. A system controller capable of connecting to at least an external device, for realizing packet transfer with the external device, the system controller comprising:
a synchronization circuit, wherein
the synchronization circuit is implemented inside of the system controller and includes,
a synchronization buffer capable of holding a packet to be transferred to and from the external device;
a storage management device capable of storing packet information into the synchronization buffer, the packet information including an address of an access destination in a memory and a type of request indicating contents of requested access;
a selection device that selects a piece of packet information stored in the synchronization buffer;
a packet generation device that artificially generates a packet to be transferred from an I/O controller to the memory according to the packet information selected by the selection device;
an analysis device that analyzes a response packet from the memory in response to the artificially generated packet and verifies an interface for the I/O controller without connecting to the I/O controller; and
a storage device including a storage area for each value available as a request ID as identification information stored in the packet, and storing state information indicating for each storage area whether or not a value corresponding to the storage area is being used as the request ID; wherein
the packet generation device refers to state information stored in each storage area of the storage device, specifies an available value as the request ID, generates a packet storing the specified value, and storing state information indicating whether the storage area corresponding to the value stored as the request ID is used; and
the analysis device specifies a value of a request ID corresponding to the response from the memory, and stores state information indicating the storage area corresponding to the specified value is not used.

2. The system controller according to claim 1, wherein the packet generation device operates with a clock used in the packet transfer.

3. A method of testing an interface for a system controller capable of connecting to at least an I/O controller, the method comprising:
storing, by a storage management device, packet information including an address of an access destination in a memory and a type of request indicating contents of requested access for each synchronization buffer for the packet transfer between the system controller and the I/O controller;
selecting, by a selection device, a piece of packet information stored in the synchronization buffer;
artificially generating, by a packet generation device, a packet to be transferred to the memory according to the selected packet information and outputting the artificially generated packet to the memory; and
analyzing, by an analysis device, a response packet from the memory in response to the artificially generated packet and verifying an interface for the I/O controller without connecting to the I/O controller, wherein
the system controller comprises a synchronization circuit, and the synchronization circuit is implemented inside of the system controller and includes the synchronization buffer, the storage management device, the selection device, the packet generation device, the analysis device and a storage device including a storage area for each value available as a request ID as identification information stored in the packet, and storing state information indicating for each storage area whether or not a value corresponding to the storage area is being used as the request ID; wherein the packet generation device refers to state information stored in each storage area of the storage device, specifies an available value as the request ID, generates a packet storing the specified value, and storing state information indicating whether the storage area corresponding to the value stored as the request ID is used; and the analysis device specifies a value of a request ID corresponding to the response from the memory, and stores state information indicating the storage area corresponding to the specified value is not used.

4. A semiconductor device capable of connecting a plurality of external devices, comprising:

a synchronization circuit, wherein the synchronization circuit is implemented inside of the semiconductor device and includes, a packet generation device that artificially generates a packet to be transferred from a first external device to a connected second external device according to packet information;

an analysis device that analyzes a response packet from the second external device in response to the artificially generated packet and verifies an interface for the first external device using an analysis result of the response packet without connecting to the first external device; and a storage device including a storage area for each value available as a request ID as identification information stored in the packet, and that stores state information indicating for each storage area whether or not a value corresponding to the storage area is being used as the request ID; wherein the packet generation device refers to state information stored in each storage area of the storage device, specifies an available value as the request ID, generates a packet storing the specified value as a request ID, and storing state information indicating the storage area corresponding to the value stored as the request ID is used, the analysis device specifies a value of a request ID corresponding to the response, and stores state information indicating the storage area corresponding to the specified value is not used, wherein a reflection of the result of analyzing the response packet is performed by storing state information indicating the storage area corresponding to a value of a request ID of the response packet confirmed by the analyzing that the second external device has processed is not used.

5. The semiconductor device according to claim 4, wherein the analysis device reflects a result of analyzing the response packet for generating of the packet by the packet generation device.

6. The semiconductor device according to claim 4, wherein the packet generation device operates with a clock used in transferring a packet with the first external device.

7. The semiconductor device according to claim 6, wherein the packet information is stored for each synchronization buffer for synchronization in transferring a packet to the first external device; and the packet generation device artificially generates the packet according to packet information selected from the packet information stored in the synchronization buffer.

8. A method of testing an interface of a semiconductor device capable of connecting a plurality of external devices, comprising:

generating, by a packet generation device, a packet to be transferred from a first external device to a second external device according to packet information prepared when the interface with the first external device that can be connected is tested; and analyzing, by an analysis device, a response packet from the second external device in response to the generated packet and verifying an interface for the first external device using an analysis result of the response packet without connecting to the first external device, wherein the semiconductor device comprises a synchronization circuit, and the synchronization circuit is implemented by inside of the semiconductor device and includes the packet generation device, the analysis device and a storage device including a storage area for each value available as a request ID as identification information stored in the packet, and that stores state information indicating for each storage area whether or not a value corresponding to the storage area is being used as the request ID; wherein the packet generation device refers to state information stored in each storage area of the storage device, specifies an available value as the request ID, generates a packet storing the specified value as a request ID, and storing state information indicating the storage area corresponding to the value stored as the request ID is used, the analysis device specifies a value of a request ID corresponding to the response, and stores state information indicating the storage area corresponding to the specified value is not used, wherein a reflection of the result of analyzing the response packet is performed by storing state information indicating the storage area corresponding to a value of a request ID of the response packet confirmed by the analyzing that the second external device has processed is not used.

9. The method according to claim 8, further comprising:
disconnecting a signal line for transferring packets from an internal circuit to buffers and disconnecting an output line in the semiconductor device.

10. The method according to claim 3, further comprising:
disconnecting a signal line for transferring packets from an internal circuit to buffers in the memory;
disconnecting a normal read pointer in the memory; and
disconnecting the synchronization circuit from the memory.

* * * * *